(12) United States Patent
Tsirline et al.

(10) Patent No.: US 9,994,043 B2
(45) Date of Patent: Jun. 12, 2018

(54) NEAR FIELD COUPLING DEVICES AND ASSOCIATED SYSTEMS AND METHODS

(71) Applicant: ZIH CORP., Lincolnshire, IL (US)

(72) Inventors: Boris Y. Tsirline, Glenview, IL (US); Mao Tian, Halifax (CA); Karl Torchalski, Arlington Heights, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days. days.

(21) Appl. No.: 15/489,335

(22) Filed: Apr. 17, 2017

(65) Prior Publication Data

US 2017/0217209 A1  Aug. 3, 2017

Related U.S. Application Data

(63) Continuation of application No. 14/316,726, filed on Jun. 26, 2014, now Pat. No. 9,660,701, which is a (Continued)

(51) Int. Cl.
*H04B 5/00* (2006.01)
*H04B 5/02* (2006.01)
(Continued)

(52) U.S. Cl.
CPC .......... *B41J 3/407* (2013.01); *G06K 7/10297* (2013.01); *G06K 17/0009* (2013.01);
(Continued)

(58) Field of Classification Search
CPC ...... H04B 5/0062; H04B 5/0068; H04B 5/02; B41J 3/407; G06K 7/10297; G06K 17/0009; G06K 17/0025; H01Q 3/24
(Continued)

(56) References Cited

U.S. PATENT DOCUMENTS 3,375,516 A * 3/1968 Hart ...................... G01S 13/762
342/51
3,713,148 A 1/1973 Cardullo et al.
(Continued)

FOREIGN PATENT DOCUMENTS

| CN | 1867451 A | 11/2006 |
|---|---|---|
| WO | 2005/022445 A3 | 3/2005 |
| WO | 2008/036907 A3 | 3/2008 |

OTHER PUBLICATIONS

Boris Y. Tsirline; UHF RFID Antennas for Printer-Encoders-Part 1: System Requirements; High Frequency Electronics; Sep. 2007; pp. 28-39 (8 pgs.); Summit Technical Media, LLC.
(Continued)

*Primary Examiner* — Brandon S Cole

(57) ABSTRACT

An example media processing device includes a coupler configured to transmit wireless signals to an encoding area, the coupler to transmit the wireless signals via a plurality of radiating elements; a controller to control which set of the radiating elements is to transmit the wireless signals; and a processor to adapt the coupler to a transponder configuration by: encoding a first transponder of the transponder configuration using the first set of the radiating elements to transmit the wireless signals; executing a first encoding evaluation on the encoded first transponder; encoding a second transponder of the transponder configuration using the second set of the radiating elements to transmit the wireless signals; executing a second encoding evaluation on the encoded second transponder; and selecting, based on the first and second encoding evaluations, the first set or the second set as a preferred radiating set for the transponder configuration.

20 Claims, 11 Drawing Sheets

US 9,994,043 B2
Page 2

Related U.S. Application Data continuation of application No. 14/028,356, filed on Sep. 16, 2013, now Pat. No. 8,791,874, which is a continuation of application No. 13/558,174, filed on Jul. 25, 2012, now Pat. No. 8,565,677, which is a continuation of application No. 12/463,841, filed on May 11, 2009, now Pat. No. 8,254,833.

(51) Int. Cl.
| | |
|---|---|
| *H01Q 3/24* | (2006.01) |
| *B41J 3/407* | (2006.01) |
| *G06K 7/10* | (2006.01) |
| *G06K 17/00* | (2006.01) |

(52) U.S. Cl.
CPC ....... *G06K 17/0025* (2013.01); *H04B 5/0062* (2013.01); *H04B 5/0068* (2013.01); *H04B 5/02* (2013.01)

(58) Field of Classification Search
USPC .............................................. 455/39–72; 1/1
See application file for complete search history.

(56) References Cited

U.S. PATENT DOCUMENTS

| | | | |
|---|---|---|---|
| 4,486,758 A | 12/1984 | de Ronde | |
| 4,614,947 A | 9/1986 | Rammos | |
| 5,977,877 A | 11/1999 | McCulloch et al. | |
| 6,118,405 A | 9/2000 | Mckinnon et al. | |
| 6,392,544 B1 | 5/2002 | Collins et al. | |
| 6,693,599 B1* | 2/2004 | Chia | H01Q 1/2225 340/505 |
| 6,894,616 B1* | 5/2005 | Forster | G06K 19/067 310/310 |
| 7,225,992 B2 | 6/2007 | Forster | |
| 7,273,173 B2 | 9/2007 | Forster | |
| 7,398,054 B2 | 7/2008 | Tsirline et al. | |
| 7,425,887 B2 | 9/2008 | Tsirline et al. | |
| 7,427,965 B2* | 9/2008 | Fabrega-Sanchez | H01Q 9/16 343/741 |
| 7,834,815 B2 | 11/2010 | Li et al. | |
| 8,254,833 B2 | 8/2012 | Tian et al. | |
| 8,565,677 B2 | 10/2013 | Tsirline et al. | |
| 8,791,874 B2 | 7/2014 | Tsirline et al. | |
| 2004/0195324 A1 | 10/2004 | Uchiyama et al. | |
| 2005/0045723 A1 | 3/2005 | Tsirline et al. | |
| 2005/0045724 A1 | 3/2005 | Tsirline et al. | |
| 2005/0058483 A1 | 3/2005 | Chapman et al. | |
| 2005/0274799 A1 | 12/2005 | Torchalski et al. | |
| 2006/0104689 A1 | 5/2006 | Marowski et al. | |
| 2007/0040689 A1 | 2/2007 | Reynolds | |
| 2007/0063843 A1 | 3/2007 | Tsirline et al. | |
| 2007/0099566 A1 | 5/2007 | Borisov et al. | |
| 2007/0216591 A1 | 9/2007 | Tsirline et al. | |
| 2007/0262873 A1 | 11/2007 | Tsirline et al. | |
| 2007/0268143 A1 | 11/2007 | Copeland et al. | |
| 2008/0238606 A1 | 10/2008 | Tsirline et al. | |
| 2009/0008448 A1 | 1/2009 | Tsirline et al. | |
| 2016/0361662 A1* | 12/2016 | Karunaratne | A63H 33/042 |

OTHER PUBLICATIONS

Boris Y. Tsirline; UHF RFID Antennas for Printer-Encoders-Part 2: Antenna Types; High Frequency Electronics; Oct. 2007; pp. 36-45 (8 pgs.); Summit Technical Media, LLC.

Boris Y. Tsirline; UHF RFID Antennas for Printer-Encoders-Part 3: Mobile Equipment; High Frequency Electronics; Nov. 2007; pp. 18-25 (5 pgs.); Summit Technical Media, LLC.

Boris Y. Tsirline: Spatially Selective Antenna for Very Close Proximity HF RFID Applications—Part 1; High Frequency Electronics; Feb. 2007; pp. 18-28; 2007 Summit Technical Media LLC.

Boris Y. Tsirline: Spatially Selective Antenna for Very Close Proximity HF RFID Applications—Part 2; High Frequency Electronics; Mar. 2007; 11 Pages; 2007 Summit Technical Media LLC.

Charles Capps; Near Field or Far Field?; EDN, Aug. 16, 2001; pp. 95-102.

Constantine A. Balanis; Chapter 2—Fundamental Parameters of Antennas: Paragraph 2.2.4-Field Regions; Antenna Theory: Analysis and Design; 2005; pp. 34-36; Third Edition; John Wiley & Sons, Inc.

David M. Pozar; Paragraph 2.5—The Quarter-Wave Transformer; Microwave Engineering; 2005; pp. 73-76; Third Edition; John Wiley & Sons, Inc.

Hung Tien Nguyen and James Lambert; Microwave Circuit Design and Non-Intrusive Antenna Imaging using Near-Field Scanning Probe; University of Manitoba, Canda; Mar. 2003; (56 pgs.).

International Search Report and Written Opinion for International Application No. PCT/US2010/034343 dated Aug. 20, 2010.

Isidor Straus; Loops and Whips, Oh My! On Low Frequency Measurement Issues; Conformity; Aug. 2002; pp. 22-28.

Isidor Straus; Near and Far Fields—From Statics to Radiation; Curtis-Straus LLC; Conformity 2001 (5 pgs.).

Kirk T. McDonald; Radiation in the Near Zone of a Hertzian Dipole; Joseph Henry Laboratories; Princeton University; Princeton, NJ; Apr. 20, 2004 (5 pgs.).

International Search Report and Written Opinion for International Application No. PCT/US2010/056590 dated Aug. 9, 2011.

Prof. Dr. R. Struzak; Antenna Theory Basics; School on Digital Radio Communication for Research and Training in Developing Countries, The Abdus Salam International Centre for Theoretical Physics ICTP Trieste (Italy), Feb. 9-28, 2004; pp. 1-75.

Rajeev Bansal; The Far-Field: How Far is Far Enough?; Applied Microwave & Wireless; Nov. 1999; pp. 58 and 60.

Ron Schmitt; Understanding Electromagnetic Fields and Antenna Radiation Takes (Almost) No Math; EDN; Mar. 2, 2000; pp. 77-88.

Sony's Electromagnetic Wave Absorber Reduces EMC and SAR Problems http://www.sony.net/products/sc-hp/ex_news/vol25/pdf/emcstw.pdf.

Tom Ahlkvist Scharfeld; An Analysis of the Fundamental Constraints on Low Cost Passive Radio-Frequency Identification System Design; Massachusetts Institute of Technology, Aug. 2001; pp. 1-115.

Xianming Qing and Ning Yang; 2.45 GHZ Circularly Polarized RFID Reader Antenna; IEEE; 2004; pp. 612-615.

European Search Report for European Application No. 15179240.5 dated Dec. 1, 2015; 7 sheets.

Korean Intellectual Property Office (KIPO), "Office Action", issued in connection with Korean Patent Application No. 10-2011-7028920 dated Mar. 21, 2016. English machine translation obtained from KIPO.

European Patent Office (EPO), "Communication from Examining Division", dated Mar. 12, 2013 in connection with EP Patent Application No. 10720969.4.

State Intellectual Property Office, "First Office Action", dated Nov. 27, 2013 in connection with Chinese Patent Application No. 201080031301.0.

State Intellectual Property Office, "Second Office Action", dated Jun. 12, 2014 in connection with Chinese Patent Application No. 201080031301.0.

State Intellectual Property Office, "Third Office Action", dated Sep. 18, 2014 in connection with Chinese Patent Application No. 201080031301.0.

Communication pursuant to Article 94(3) EPC issued on Apr. 24, 2018, by the European Patent Office in regards to Application No. 15179240.5.

\* cited by examiner

NEAR FIELD COUPLING DEVICES AND ASSOCIATED SYSTEMS AND METHODS

RELATED APPLICATIONS

This patent arises from a continuation of U.S. patent application Ser. No. 14/316,726, filed on Jun. 26, 2014, which is a continuation of U.S. patent application Ser. No. 14/028,356, filed Sep. 16, 2013, now U.S. Pat. No. 8,791,874, which is a continuation of U.S. patent application Ser. No. 13/558,174, filed Jul. 25, 2012, now U.S. Pat. No. 8,565,677, which is a continuation of U.S. patent application Ser. No. 12/463,841, filed May 11, 2009, now U.S. Pat. No. 8,254,833, which are all incorporated herein by reference in their entireties.

BACKGROUND

1. Field of the Invention

The present invention relates to RFID (Radio Frequency Identification) systems and, in particular, to near field antennas for such systems configured to selectively communicate with a targeted RFID transponder from among a group of adjacent transponders.

2. Description of Related Art

RFID technology is rapidly becoming essential to not only accurately manage assets and inventory, but also in a variety of other practical applications. With respect to inventory applications, RFID tags, also known as transponders, are being used to count and identify inventory in retail stores, warehouses, shipping containers, and the like, to allow for more accurate bookkeeping and ordering of replacement or replenishment goods. Moreover, it has been determined that many other applications for RFID technologies are becoming increasingly beneficial and/or economical. For example, RFID transponders are being used in security applications to grant individuals access to secure areas. RFID transponders are also being used in vehicles to pay tolls while maintaining vehicle speeds. Further, RFID transponders are even being implanted in pets to allow for accurate identification of a pet in the event that the pet is lost. As such, RFID technology is becoming ubiquitous in a wide variety of applications, and new applications for the technology are being developed continuously.

A conventional RFID system provides for wireless data acquisition from/to transponders to/from a transceiver. In various applications, the transponders may be active (e.g., battery-powered, battery-assisted, or battery supported) or passive (e.g., activated by an RF field). A conventional transponder includes an antenna that facilitates the reception of communications from the transceiver. In order to encode (e.g., read, write), the transceiver through an antenna of the transceiver exposes the transponder to a radio frequency (RF) electromagnetic field or signal. In the case of a passive UHF transponder, the RF electromagnetic field energizes the transponder and thereby enables the transponder to respond to the transceiver by re-radiating the received signal back and modulating the field in a well-known technique called backscattering. In the case of an active transponder, the transponder may respond to the electromagnetic field by transmitting an independently powered reply signal to the transceiver. In this manner, various applications for RFID technology may be implemented.

Some RFID applications utilize transponders that may be encoded prior to utilization within a system. In this regard, a transponder may be encoded by communicating commands and/or data to a transponder such as, for example, a unique identifier. The transponders may be encoded in a number of ways. In some instances, a printer may be configured with a specialized printhead or other apparatus (e.g., a printer-encoder) that may be utilized to encode the transponders. The encoding process can involve magnetic coupling the transponder to the printer-encoder through an antenna of the printer-encoder such that commands or data are transmitted to the transponder to facilitate the encoding process. Some conventional printer-encoders can encode transponders that are affixed to or embedded on a media, such as a smart label or a tag. When the media passes through the printer-encoder, the printer-encoder is configured to encode the transponders affixed to the media such that the transponders may be later used in connection with other RFID systems and applications.

However, in some instances, errors in the encoding process (e.g., improperly encoded transponders or encoding failures) can occur due to the variations of the justification and type of transponders to be encoded. Justification refers to the location of the transponder relative to the antenna or other reference point of a printer-encoder. The encoding errors largely arise from non-uniform location or orientation of the transponder on the media received by a printer-encoder. As a result, the location of the transponders relative to the antenna of the printer-encoder may be unpredictable, and the electromagnetic field generated by the antenna of the printer-encoder may not be effective for encoding of the transponders. As such, it may be desirable to develop and implement a system and antenna that can account for the unpredictability of the positioning of a transponder relative to the near-field coupling device.

BRIEF SUMMARY

Accordingly, exemplary embodiments of the present invention provide for a dynamic near-field coupling device that may be configured to adaptively change coupling strength and relative coupling position. In some embodiments, the near-field coupling device may be included in a printer-encoder to provide for encoding of transponders. According to various exemplary embodiments, a near-field coupling device may include one or more conductive strips and a terminating load. The near-field coupling device may also include various means for adaptively changing the coupling strength and relative coupling position, such as, for example, via switching devices. In some exemplary embodiments, the pattern of the electromagnetic field produced by the near-field coupling device may be generated by selecting a ratio of a total characteristic impedance of one or more coupling elements to the terminating load impedance. In some embodiments, the ratio may be selected such that the total characteristic impedance of the coupling elements is greater than or less than the terminating load.

For example, according to an embodiment of the present invention, a near-field coupling device for coupling a transceiver with a targeted transponder is provided. The near field coupler device includes a ground plane, a dielectric substrate, a terminating load, a first conductive strip, a second conductive strip, and a switching element. The dielectric substrate is adjacent to the ground plane. The first conductive strip is adjacent the dielectric substrate, extends from a port end to a loaded end, and is connected to the terminating load. The first conductive strip and the ground plane form a first coupling element having a length of one half-wavelength or multiple thereof. The second conductive strip is adjacent the dielectric substrate, extends from the port end to the loaded end, and is connected to the terminating load.

The second conductive strip and the ground plane form a second coupling element having a length of one half-wavelength or multiple thereof. The switching element is for selectively electrically connecting one or more of the first and second coupling elements with the transceiver. The connected coupling elements define a total characteristic impedance of the connected coupling elements. In a first configuration of the switching element, the total characteristic impedance of the connected coupling elements is greater than the terminating load. In a second configuration of the switching element, the total characteristic impedance of the connected coupling elements is less than the terminating load.

The impedances of the coupling elements relative to each other may vary. As examples, an impedance of the first coupling element, in isolation, may be approximately equal to or greater than an impedance of the second coupling element, in isolation. As further examples, a width of the first conductive strip may be approximately equal to or greater than a width of the second conductive strip.

The near-field coupling device may further include one or more additional conductive strips. Each additional conductive strip may form an additional coupling element having a length of one half-wavelength or multiple thereof. The switching element may be further configured to selectively connect the additional coupling elements and further adjust the total characteristic impedance of the connected coupling elements.

Each of the first and second conductive strips may define a linear shape and may be parallel to the other conductive strip.

The first and second conductive strips may be configured to generate an electromagnetic field and are capable of activating the targeted transponder as the targeted transponder moves through the electromagnetic field.

In another embodiment, an apparatus comprising a processor is provided. The processor may be configured to receive indications of a transponder type and a transponder position justification; and connect one or more coupling elements of a near-field coupling device depending on at least the transponder type and the transponder position justification to configure a total characteristic impedance of the coupling elements relative to a terminating load of the near-field coupling device.

The processor configured to connect the one or more coupling elements may further include being configured to connect the one or more coupling elements to configure the total characteristic impedance of the coupling elements to be greater than or less than the terminating load. For example, the processor configured to connect the one or more coupling elements may include being configured to connect the one or more coupling elements to configure the total characteristic impedance of the coupling elements to be greater than the terminating impedance when the transponder type describes a loop-type transponder and the transponder position justification is edge justified.

The processor configured to connect the one or more coupling elements may further include being configured to connect the one or more coupling elements by controlling a respective switching device associated with the one or more coupling elements.

The processor may further be configured to encode one or more transponders by providing for transmission of a signal to a port of the near-field coupling device.

According to yet another embodiment, a method is provided. The method may include receiving indications of a transponder type and a transponder position justification; and connecting one or more coupling elements of a near-field coupling device based on at least the transponder type and the transponder position justification to configure a total characteristic impedance of the coupling elements relative to a terminating load of the near-field coupling device.

The operation of connecting the one or more coupling elements may include connecting the one or more coupling elements to configure the total characteristic impedance of the coupling elements of the near-field coupling device to be greater than or less than the terminating load. For example, connecting the one or more coupling elements may include connecting the one or more coupling elements to configure the total characteristic impedance of the coupling elements to be greater than the terminating load when the transponder type is a loop-type transponder and the transponder position justification is edge justified.

The operation of connecting the one or more coupling elements may includes being configured to connect the one or more coupling elements by controlling a respective switching device associated with the one or more coupling elements.

The method may further include encoding one or more transponders by providing for transmission of a signal to a port of the near-field coupling device.

BRIEF DESCRIPTION OF THE SEVERAL VIEWS OF THE DRAWING(S)

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. The term "exemplary," as used herein, is not provided to convey any qualitative assessment, but is used instead to merely convey an illustration of an example.

Exemplary embodiments of the present invention concern an apparatus for enabling an RFID transceiver to communicate with a transponder that may be commingled among or positioned in close proximity to multiple adjacent transponders. As will be apparent to one of ordinary skill in the art, various exemplary embodiments of the present invention are described below that communicate with a targeted transponder, in some instances, requiring little to no electromagnetic isolation of the transponder. However, some exemplary embodiments of the present invention may make use of, for example, space-consuming shielded housings, anechoic chambers, or relatively more complex, time consuming, or costly collision management techniques.

Several exemplary embodiments of the present invention may be useful for encoding (e.g., reading or writing actions) to passive or active transponders attached to, for example, portions of media being fed through a printer-encoder, items on an assembly line or in an inventory management center, or in various other circumstances, including circumstances where the transponders are in close proximity to each other. In various embodiments, one or more transponders may be mounted to, or embedded within a portion of a media, such as a label, ticket, card, other media forms, or the like that may be carried on a liner or carrier. In alternate linerless embodiments, a liner or carrier may not be needed. Such RFID enabled labels, tickets, tags, other media forms, or the like are referred to collectively herein as "media units," "smart media units," or "RFID smart cards." As will be apparent to one of ordinary skill in the art, it may be desirable to print indicia such as text, numbers, barcodes, graphics, etc., to such media units before, after, or during communications with their corresponding transponders.

An example of an RFID system that may benefit from one or more of the embodiments of the present invention is a RFID enabled printer system, also referred to herein as a "printer-encoder" or a RFID print-engine applicators. Examples of printer-encoders are disclosed in commonly-owned U.S. Pat. Nos. 6,848,616; 7,137,000; 7,398,054; and 7,425,887 and U.S. Publication Nos. 2007/0216591; 2007/0262873; 2008/0074269; 2008/0117027; and 2008/0238606 which are hereby incorporated herein by reference.

Figure 1:
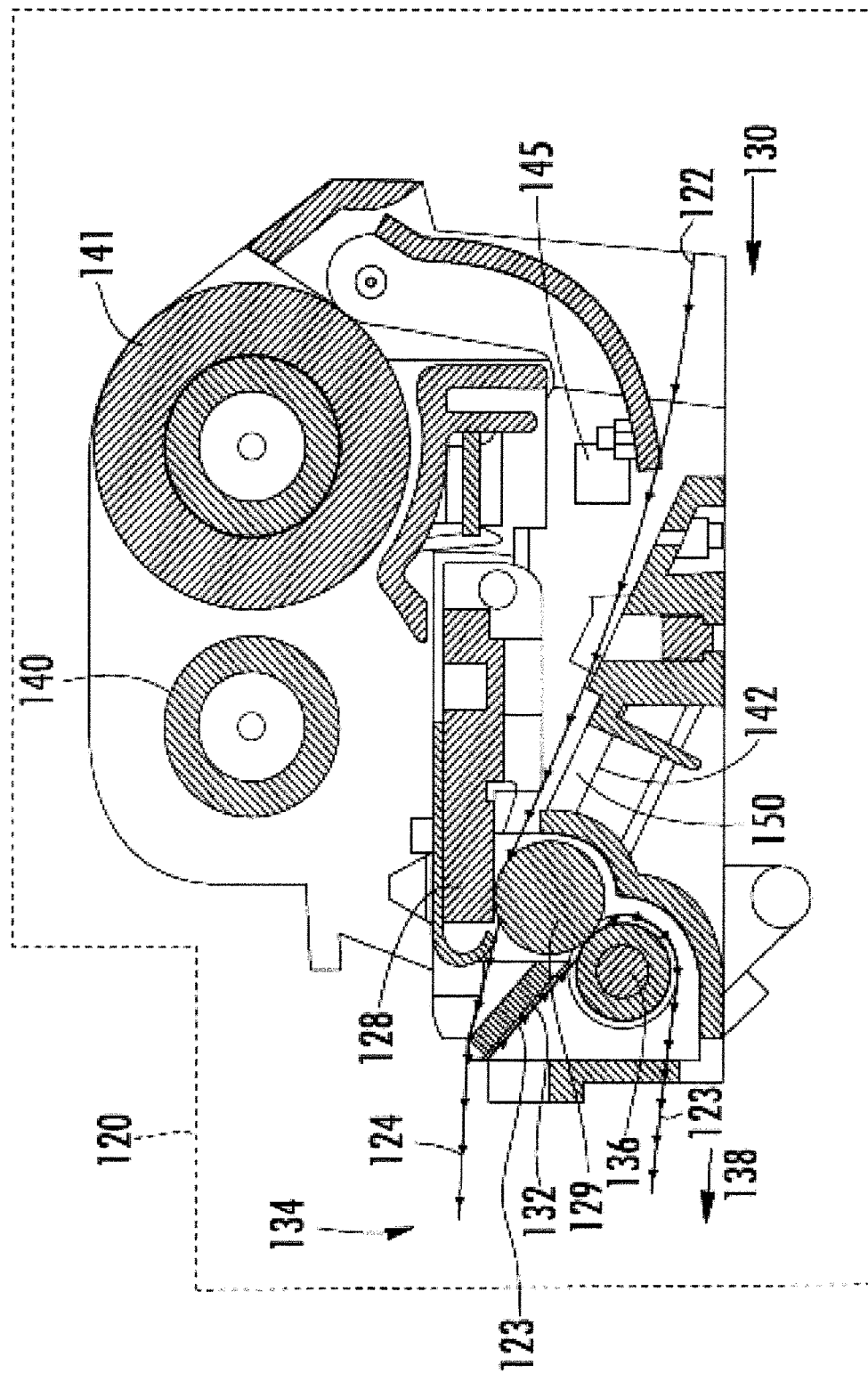
FIG. 1 illustrates a side schematic view of a printer-encoder according to an exemplary embodiment of the present invention.

FIG. 1 illustrates an example of an RFID printer-encoder 120 that may be configured to print and/or encode a series or stream of media units 124. The printer-encoder 120 may include several components, such as a printhead 128, a platen roller 129, a peeler bar 132, a roller 136, a ribbon take-up spool 140, a ribbon supply roll 141, a transceiver 142, a controller 145, and a RFID coupling device, such as a near-field coupling device 150. The configuration of the printer-encoder 120 may also define a feed path 130, a media exit path 134, and a carrier exit path 138.

As noted above, media units may include labels, cards, etc., that may be carried by a substrate liner or web 122. The web 122 may be directed along the feed path 130 and between the printhead 128 and the platen roller 129 to allow for printing indicia onto the media units 124. The ribbon supply roll 141 may include a thermal ribbon (not shown for clarity) that extends along a path such that a portion of the ribbon is positioned between the printhead 128 and the media units 124. The printhead 128 may heat up and press a portion of the ribbon onto the media units 124 to print indicia on the media units 124. The take-up spool 140 may be configured to receive and spool the used ribbon. Printing in the manner described can be referred to as a thermal transfer printing. Several other printing techniques may be used including, but not limited to, direct thermal printing, inkjet printing, dot matrix printing, electro-photographic printing, laser, or the like.

After printing, the media unit web 122 may proceed to the media exit path 134 where the media units may be removed from the web 122. For example, in one exemplary embodiment, pre-cut media units 124 may be peeled from the web 122, to separate the media unit from the backing 123, using the peeler bar 132 as shown. In other exemplary embodiments, a group of multiple media units may be peeled together and transmitted downstream to an in-line cutter for subsequent separation (not shown). Various other known media unit removal techniques may be used, as will be apparent to one of ordinary skill in the art.

In applications, such as the depicted embodiment, in which the media units 124 are supported by a web 122, the web 122 may be guided along a path toward the carrier exit path 138 by roller 136 or other devices, once being separated from the media units. Techniques and structures for conveying or guiding the web of media units along the entire feed path of the printer-encoder may be referred to as conveyance systems.

The transceiver 142 and the near-field coupling device 150 may be configured to communicate with a targeted transponder on a media unit by being controlled by, for example, a processor. The transceiver 142 and/or the near-field coupling device may be controlled by hardware and/or software configured processor, such that communication signals, for example to encode the transponder, may be provided via the processor. In some exemplary embodiments, a transponder that is affixed to a media unit 124 may be encoded as the transponder passes the near-field coupling device 150 along the feed path 130.

The transceiver 142 may be configured to generate and transmit RF communication signals that are broadcasted by the near-field coupling device 150 located in close proximity to the media feed path 130 and the corresponding media unit. For purposes of the present specification, the transceiver 142 and the near-field coupling device 150 may be referred to collectively as forming at least part of a communication system. The communication signals generated by the transceiver 142 or re-radiated by a passive transponder (or generated by an active transponder) may be in the ultra-high frequency (UHF) band. However, some embodiments of the present invention may also be configured to operate using the various other various frequency bands allocated for RFID communications, such as, but not limited to, very high frequency (VHF), high frequency (HF), or the like. As explained in more detail below, the RFID interrogation system generates an electromagnetic field for the transponder activation over a mutual coupling link between the transceiver and a targeted transponder of a media unit that is located within a predetermined area, referred to herein as either the encoding area, such that data may be read from and/or written to the transponder.

In general, a transceiver in a RFID system, such as the transceiver 142, can be a device configured to generate, process, and receive electrical signals through the use of an antenna or, in close proximity, a near-field coupling device. One skilled in the art would appreciate that similar devices such as readers, transmitters, receivers, or transmitter-receivers may be used with or be part of this invention. Further, the term "transceiver" as used in the present application and the appended claims refers to the devices noted above and to any device capable of generating, processing, or receiving electrical and/or electromagnetic signals.

FIGS. 5a through 5d depict various exemplary embodiments of the near-field coupling device 150 that may be utilized to manage a transceiver-transponder data communications. The near-field coupling device 150 may be utilized by, or otherwise used in connection with a transceiver (not shown in FIGS. 5a through 5d). The near-field coupling device 150 may include one or more terminated radiating elements or conductive strips 530, 540a-h. The conductive strips 530, 540a-h may be electrically connected to a port 500 (e.g., an input/output port, RF port, etc.) and a terminating load 510. The conductive strips 530, 540a-h may be switchable conductive strips such that the conductive strips 530, 540a-h may be connected to either the port 500 or the terminating load 510 through switching devices 520a-h.

The port 500 may connect the transceiver to one or more conductive strips (possibly through one or more switching devices). Further, the port 500 may be used to provide a signal to the conductive strips 530 and 540 for contactless communication via the conductive strips. The terminating load 510 may be connected to the one or more conductive strips, possibly through one or more switching devices 520a-h, at a first terminal and may be grounded at a second terminal.

The near-field coupling device 150 may also include a dielectric substrate 550 and a ground plane 560. The dielectric substrate 550 may have a first surface and a second surface opposite the first surface. The conductive strips 530 and 540 may be affixed to the first surface of the dielectric substrate 550. The ground plane 560 may be affixed to the second surface of the dielectric substrate 550. The ground plane 560 may have various shapes. For example, the ground plane 560 may be generally rectangular or circular and/or correspond to the overall shape of the near-field coupling device or follow the shape of one or more conductive strips. The ground plane 560 may be constructed of copper, gold, silver, aluminum or combination thereof, doped silicon or germanium, or any electrically conductive material. The general shape of the dielectric substrate 550 may vary between applications. For example, the dielectric substrate 550 may be a portion of a relatively larger printed circuit board. The dielectric substrate 550 may be made or constructed from various dielectric materials, including but not limited to, plastics, glasses, ceramics, or combinations such as Rogers materials, Isola materials, or woven glass reinforced epoxy laminate, commonly referred to as "FR4" or flame resistant 4. Moreover, air may be used as a dielectric material. One skilled in the art would appreciate that these or other materials may be used to achieve or utilize a specific dielectric constant. For example, a higher dielectric constant value or permittivity may allow for a further decrease in the dimensions of the coupler 50, including the thicknesses of the dielectric substrate and the length of the conductive strips.

During encoding operations, as the electrical signal from the transceiver passes through the one or more of the conductive strips, the conductive strips and the ground plane operate as coupling elements. Half-wavelength segments of the coupling elements may be defined such that the characteristic impendence of the coupling elements need not be matched or are mismatched from the terminating load impedance. As such, the near-field coupling device 150 may operate as one or more one-half wavelength unmatched coupling elements, rather than operating as a standing wave radiating antenna or a magnetic field generating coil. Due to the structure of the near-field coupling device 150, the passing current in the conductive strips generates an electromagnetic field mostly concentrated in the near-field region of the near-field coupling device.

Figure 6A:
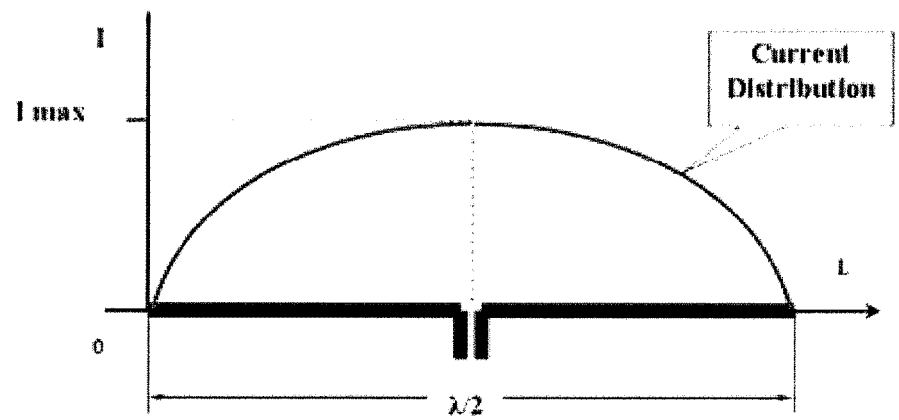
FIG. 6a is a graphical illustration of the current distribution along the length of a dipole-type antenna.
Figure 6B:
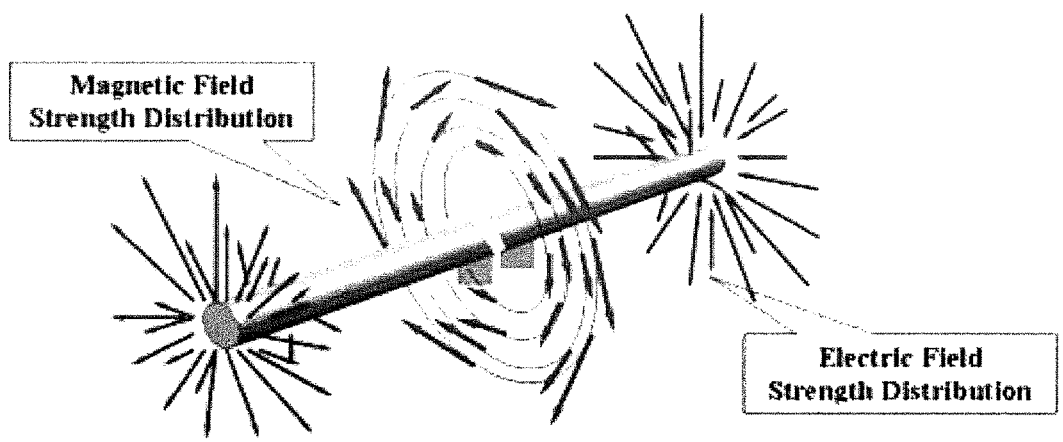
FIG. 6b is an illustration of the magnetic and electric field strength distribution of a dipole-type antenna.
Figure 7A:
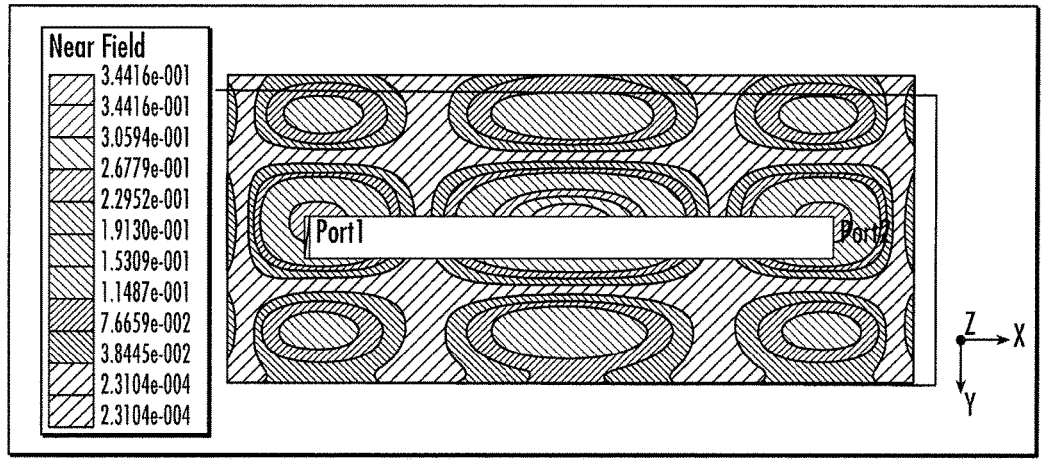
FIG. 7a is an illustration simulated on Ansoft HFSS software of magnetic field distribution where the maximum field strength is located near the center of a half wavelength coupling device with a characteristic impedance lower than a terminating load impedance according to an exemplary embodiment of the present invention.
Figure 7B:
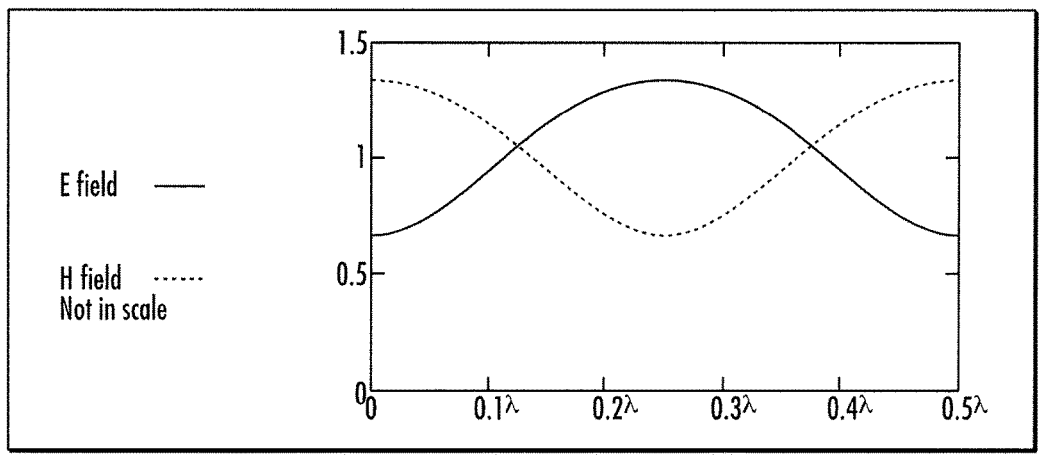
FIG. 7b is a graphical illustration simulated on Ansoft HFSS software of the magnetic and electric field strength along a half wavelength coupling device with a characteristic impedance larger than a terminating load impedance according to an exemplary embodiment of the present invention.
Figure 7C:
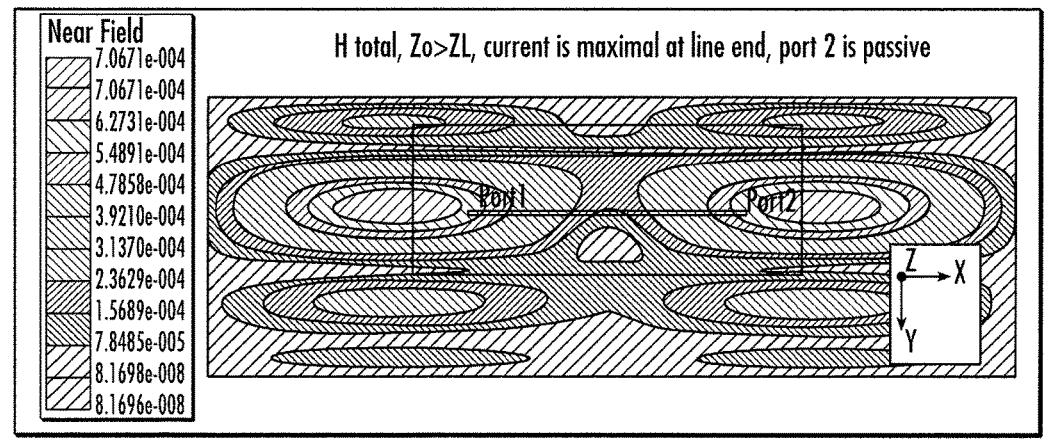
FIG. 7c is an illustration simulated on Ansoft HFSS software of the magnetic field distribution where the maximum magnetic field strength is located near the longitudinal edges of a half wavelength coupling device with a characteristic impedance larger than a terminating load impedance according to an exemplary embodiment of the present invention.

In particular and as illustrated in FIGS. 6b, 7a, and 7c, the wave radiation generated by exemplary near field antenna embodiments of the present invention may create a near field effect that emanates from the edges of the one or more conductive strips as further described below. The near field effect may couple with a targeted transponder passing through the encoding area as described with respect to FIG. 2 further below. For purposes of the present invention and appended claims the term "near field effect" refers to the one or more relatively localized electromagnetic fields that are also commonly referred to as "leaky" electromagnetic fields, as further described in "Leaky Fields on Microstrip" L. O. McMillian et al. Progress in Electromagnetics Research, PIER 17, 323-337, 1997 and in commonly owned U.S. Pat. No. 7,398,054 to Tsirline and U.S. Patent Publication Nos. 2005/0045724, 2007/0262873, and 2007/0216591 to Tsirline et al., all of which are hereby incorporated by reference in their entireties. The effective range of couplers or antenna-couplers relying on such leaky electromagnetic fields, referred to as near-field coupling devices, may be limited because the fields degrade, at an exponential rate, with increasing separation from the near-field coupling device. This limited range may reduce the likelihood that an electromagnetic field emanating from a near-field coupling device will activate a transponder outside the intended encoding area.

Figure 2:
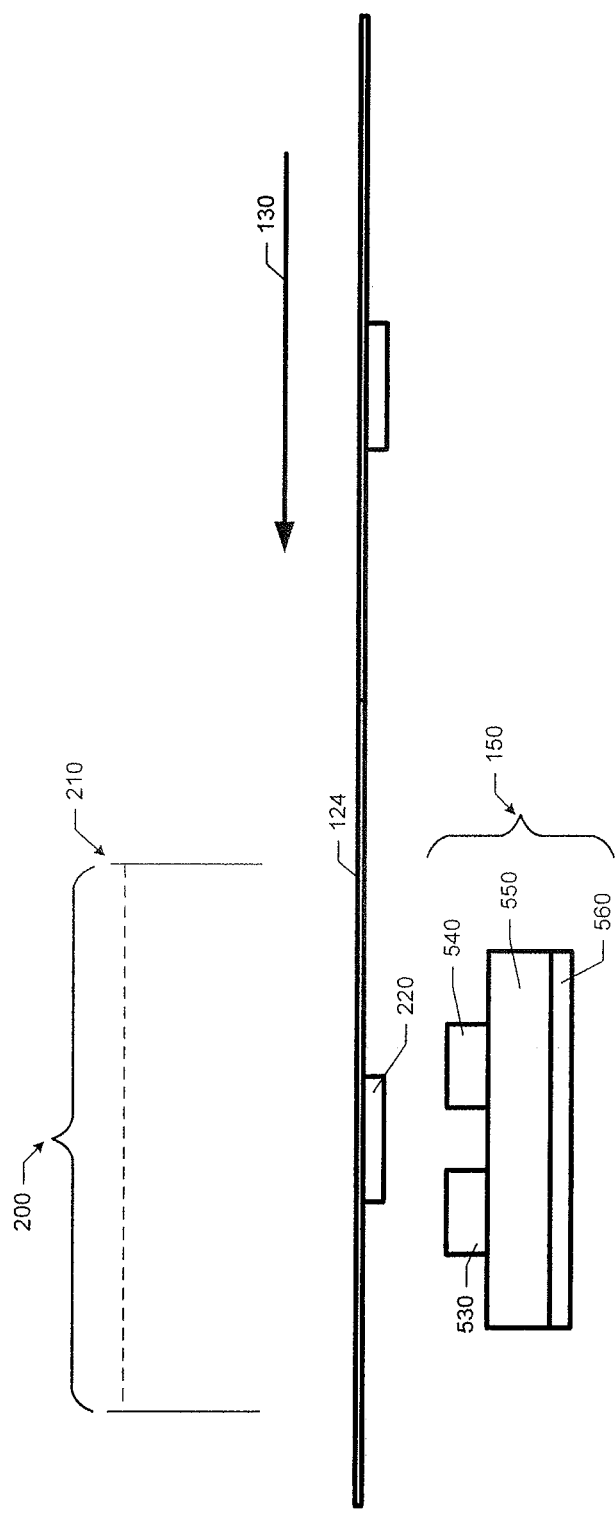
FIG. 2 illustrates a side view of a feed path of media units in a printer-encoder consistent with an exemplary embodiment of the present invention.
Figure 3A:
FIG. 3a illustrates an example of a long and narrow dipole-type transponder consistent with an exemplary embodiment of the present invention.
Figure 3B:
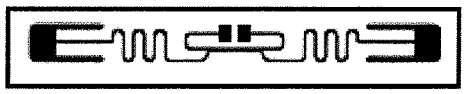
FIG. 3b illustrates another example of a long and narrow dipole-type transponder consistent with an exemplary embodiment of the present invention.
Figure 3C:
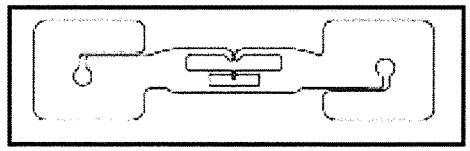
FIG. 3c illustrates another example of a long and narrow dipole-type transponder consistent with an exemplary embodiment of the present invention.
Figure 3D:
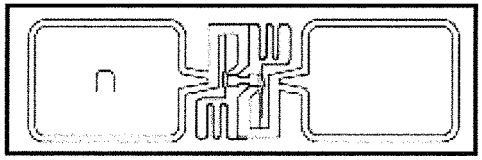
FIG. 3d illustrates another example of a long and narrow dipole-type transponder consistent with an exemplary embodiment of the present invention.
Figure 3E:
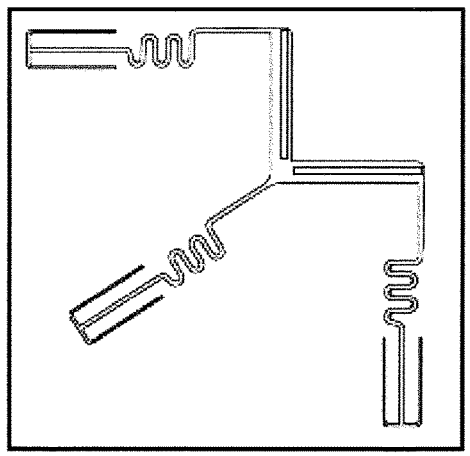
FIG. 3e illustrates an example of a long and wide two port IC dipole-type transponder consistent with an exemplary embodiment of the present invention.
Figure 3F:
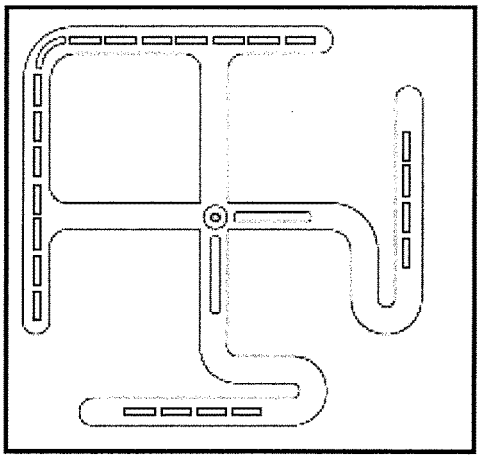
FIG. 3f illustrates another example of a long and wide port IC dipole-type transponder consistent with an exemplary embodiment of the present invention.
Figure 4C:
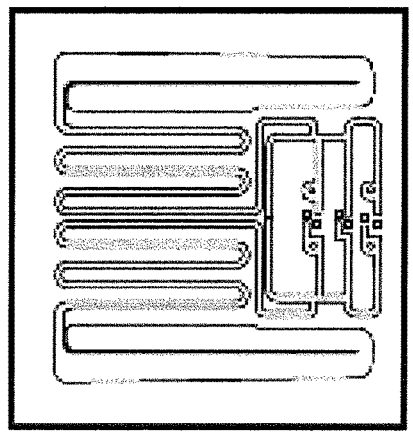
FIG. 4c illustrates an another example of a small loop-type transponder consistent with an exemplary embodiment of the present invention.
Figure 4F:
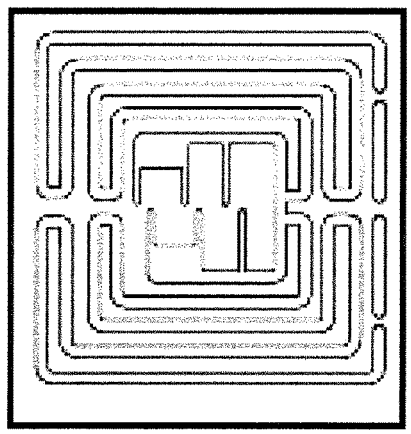
FIG. 4f illustrates yet another example of a small loop-type transponder consistent with an exemplary embodiment of the present invention.
Figure 4B:
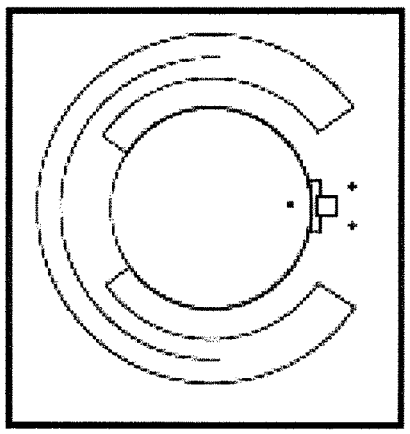
FIG. 4b illustrates another example of a small loop-type transponder consistent with an exemplary embodiment of the present invention.
Figure 4E:
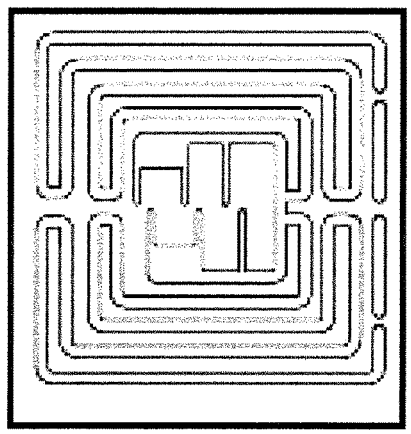
FIG. 4e illustrates an another example of a small loop-type transponder consistent with an exemplary embodiment of the present invention.
Figure 4A:
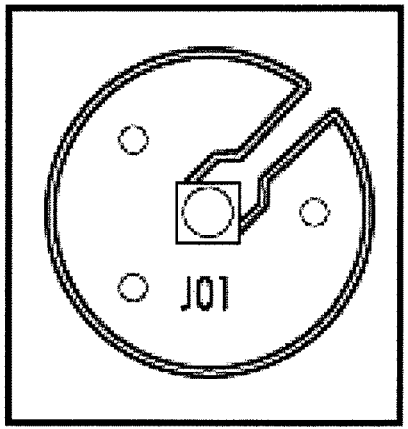
FIG. 4a illustrates an example of a small loop-type transponder consistent with an exemplary embodiment of the present invention.
Figure 4D:
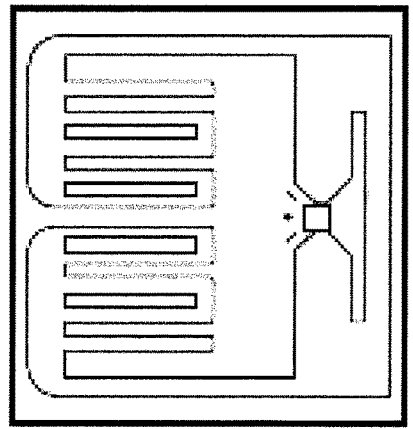
FIG. 4d illustrates an another example of a small loop-type transponder consistent with an exemplary embodiment of the present invention.

For example, FIG. 2 depicts a simplified view of the feed path 130 relative to the near-field coupling device 150. The near-field coupling device 150, as depicted in FIG. 2, includes conductive strips 530 and 540, a dielectric layer 550, and a ground plane 560. The media unit 124 travelling along the feed path 130 may include a transponder 220 and be affixed to a web (not shown). The electromagnetic field generated by the near-field coupling device 150 has a near-field strength and far-field strength. As explained above, the near-field coupling device 150 may be configured to generate an electromagnetic field that has a strength in the near-field that differs from a strength in the far-field. In some exemplary embodiments, the strength in the far-field may be too weak to activate or communicate with the transponder, while the strength in the near-field may be strong enough to activate the transponder. In other words, the near-field coupling device 150 may configured to generate an electromagnetic field having a strength in the far-field too weak to activate a transponder and a strength in the near-field sufficient to activate a transponder.

As the media unit 124 and the transponder 220 move along the feed path 130, the transponder 220 may arrive at a location where near-field energy of the coupling device 150 is sufficient for a transponder encoding, i.e., the transponder may reach a location in which the transponder is within the near-field of the electromagnetic field generated by the near-field coupling device and that field is sufficient to activate the transponder. The closest distance from any reference point, e.g., a tear bar, a printline, etc., along the feed path 130 where a transponder initially is activated, such as point 210 in the illustrated embodiment, in the near-field of the coupling device 150 can define a transponder "encoding starting distance."

Further, according to various exemplary embodiments, an encoding range 200 of the near-field coupling device may be defined as the starting distance to a second point or location where a transponder encoding process is not longer possible, i.e., the location in which the transponder gets an insufficient coupling with the near-field coupling device 150 and reaches a location in which the electromagnetic field strength can not activate the transponder. The encoding range depends both on the characteristics of the near-field coupling device and the form-factor (i.e., physical dimensions) of the transponder. In some exemplary embodiments, the encoding range of the near-field coupling device 150 may be two to three inches. Together, the encoding starting point 210 and the encoding range 200, may define an encoding area where communications between a transponder and a transceiver utilizing the near-field coupling device can occur. In some embodiments, the encoding area may be approximately equal to or less than the form-factor of the transponder and, thus, the near-field coupling device is capable of only encoding one transponder at a time. The following parameters may define a printer encoding performance for a particular type of transponder: (1) the encoding starting point relative to a reference point within the printer, such as the printhead; (2) the encoding range; and (3) the RF operation power level necessary to ensure successful encoding of the transponder.

In some applications, such as portable and compact systems (e.g., RFID printer-encoders), the near-field coupling device may be near or in close proximity to a printhead. For example, the near-field coupling device may be close enough to the printhead and has a short encoding range that at least a part of the encoding area for some types of transponders overlaps the printhead (e.g., the encoding starting distance relative to the printhead or a tear bar may be 0), which may allow the system to encode the shortest possible labels or maintain the shortest pitch between labels. In other words, the system may be configured such that the system may print indicia onto the media unit while a transceiver is communicating with the transponder of the same media unit. The close proximity of the near-field coupling device and printhead may be necessary or desirable in order to maintain overall compact design of the system.

The type or category of transponders that may be used in connection with embodiments of the present invention may vary. FIGS. 3a through 3f illustrate examples of a first category or group of transponders that may be implemented in accordance with various aspects of the present invention. The exemplary transponders depicted in FIGS. 3a through 3d may be referred to as long and narrow or long dipole-type transponders, due to the structure of the antennas of the transponders. The exemplary transponders depicted in FIGS. 3e and 3f may be referred to as long and wide. FIGS. 4a through 4f illustrate examples of a second category or group of transponders that may be implemented in accordance with various aspects of the present invention. The exemplary transponders depicted in FIGS. 4a through 4f may be referred to as an item-level or a small loop-type transponders, due to the structure of the antennas of the transponders. Terms such as "long and narrow," "long and wide," "large", and "small" are intended to indicate the relative size of the transponders compared to an operational wavelength of the RFID system and the transponder or compared to the transponder's relative dimensions. As examples, a large dipole-type may be about 3 inches long (i.e., the largest dimension of the dipole-type) and may be about 0.3-0.6 inches wide, and a small loop-type may be about 1 inch long and 1 inch wide.

In general, at the center of the operating band or spectrum (or at the operating frequency) of the near-field coupling device, the port impedance of one or more coupling elements that have a length of one half wavelength, or multiple thereof, is substantially equal to the terminating load impedance regardless of the characteristic impedance of the one or more coupling elements formed by or defined by the structure of the one ore more conductive strips and the ground plane. Therefore, in some embodiments, the length of the one or more coupling elements may be one half wavelength, or multiple thereof (i.e., the length may substantially equal $N*\lambda/2$, wherein N may equal 1, 2, 3, 4, 5, . . . ) and the terminating load may be configured to match the source impedance in order to substantially match the source impedance and the input impedance.

In some exemplary embodiments, the length of conductive strips 530 and 540 may be determined based on the predetermined wavelength of a communications signals to be used in an RFID system and the permittivity of the dielectric substrate. In this regard, the length of the conductive strips 530 and 540 may be half-wavelength (or half-wave), or an integer multiple of half-wave. In some exemplary embodiments, the conductive strips 530 and 540a-h may be configured to exhibit the properties of a half-wave dipole antenna.

The characteristic impedance of a coupling element may be defined by the cross-section structure of the coupling element. For embodiments in which the coupling element is a conductive strip and the ground plane, the cross-section may be mostly defined by the width and thickness of the conductive strip and a distance to the ground plane. Because it has no or minimal influence on the port impedance of the near-field coupling device at the center operating frequency for embodiments having a length of one half wavelength or multiples thereof, the conductive strip may be dimensioned to achieve proper coupling with a targeted transponder, while the terminating load is configured to maintain an impedance match between the near-field coupling device and the transceiver. For example, the width of the conductive strip may be decreased or increased to produce a desired operating bandwidth of the near-field coupling device. In general, it is believed that the closer the impedance of the coupling element is to the value of the terminating load (e.g., 50 Ohm) the wider the bandwidth or the higher cut off frequency with some limit. The impedance of the terminating load may be modified to match the source impedance (e.g., RF signal source impedance, transceiver impedance, system impedance).

The electromagnetic field pattern generated by the conductive strips may be concentrated between the conductive strips and the ground plane, and as a result, the field strength above the conductive strips may be relatively low. When the total characteristic impedance of the coupling elements (formed be the one or more conductive strips and the ground plane) is lower than a terminating load then the maximum strength of the magnetic field component is located approximately at the center of the coupling elements or the near-field coupling device and the maximum strength of the electric field component is located at the edges of the coupling elements or the near-field coupling device as illustrated in FIGS. 6a and 6b. FIG. 7a illustrates a representation of the magnetic field strength adjacent to a coupling element with a total characteristic impedance of the coupling elements is less than the terminating load. With respect to FIG. 7a, note that the magnetic field intensity is maximized near or at the center of the coupling elements.

Although the relationship between the characteristic impedance of the coupling elements and the terminating load impedance may vary, according to an exemplary embodiment of the invention, the total characteristic impedance of the coupling elements may be lower than the terminating load in order to maximize the magnetic field at the center of the coupling elements. Further, terminating the coupling elements with a load that is substantially equal to the source impedance and greater or lower than the characteristic impedance of the coupling elements forms what is known in the art as a "band-pass filter." A band-pass filter is a device that is configured to transfer signal without degrading amplitude or power with a particular frequency or having a particular bandwidth. For example, the near-field coupling device may have an operating frequency band of 902 MHz-928 MHz and a center operating frequency of 915 MHz. As another example, the operating frequency band may be from 870 MHz up to 953 MHz.

When the total characteristic impedance of the one or more coupling elements is greater than the impedance of the terminating load, the maximum strength of the magnetic field component can be at the edges of the coupling element or elements, and the maximum strength of the electrical field component can be at the center of the coupling element or elements. FIG. 7b illustrates a graphical representation of relative strengths of the electric and magnetic fields distribution along a half wavelength coupling element having a characteristic impedance greater than the terminating load. Further, FIG. 7c illustrates another two-dimensional representation of the magnetic field strength of adjacent to a coupling element with a characteristic impedance greater than the terminating load. With respect to FIG. 7c, note again that due to the characteristic impedance of the coupling element being greater than the terminating load, the magnetic field intensity is maximized at or past the ends of the coupling element. The distribution of electric and magnetic field components for a coupling element, such as microstrip and stripline transmission lines is further discussed in detail in "UHF RFID Antennas for Printer-Encoders-Part 1: System Requirements", High Frequency Electronics, Vol. 6, No. 9, September 2007, pp. 28-39 which is authored by one of the inventors of the present application and is hereby incorporated by reference in its entirety.

Accordingly, the selection of the ratio between the total characteristic impedance of the one or more coupling elements of the near-field coupling device 150 to the terminating load of a near-field coupling device 150, which can be referred to as the "impedance ratio," may allow for variations in the electric and magnetic field patterns formed by the near-field coupling device 150. As such, by adjusting the impedance ratio, the location of the maximum electric or magnetic field can be controlled. Various tests involving the encoding of transponders have determined that some transponders are activated or require less RF power applied to a near-field coupling device when proximate to a relatively strong magnetic field component. In particular, loop-type transponders, such as those depicted in FIGS. 4a through 4c, and miniature dipole-type transponders with a small loop element, such as those depicted in FIGS. 4d-4f, have been found to be sensitive to the magnetic field component. As such, adjustments to the location of the maximum magnetic field may be desirable based on the location of a loop-type or other type of transponder during, for example, an encoding process.

According to exemplary embodiments of the present invention, various means for modifying the impedance ratio may be utilized. For example, the switching devices 520 may be configured to selectively connect an associated conductive strip thereby introducing a change in the total characteristic impedance of the connected coupling elements of a near-field coupling device 150. The term "connected" or "connect" as used herein refers to a conductive strip or a coupling element being electrically connected to the port 500 and the terminating load 510 such that the coupling element receives the signals from the transceiver via the port 500 and broadcasts the signals. The switching devices 520 may be RF switches with 50 Ohm impedance of Pole and each Throw switching devices capable of establishing or interrupting an electrical connection with a coupling element. In some exemplary embodiments, the switching devices 520 may be mechanical switches, transistors, PiN diodes, or the like. The switching devices 520 may be controlled by a processor (e.g., a software and/or hardware configured processor, including a field programmable gate array (FPGA)), a controller, other combinational logic, or the like. In this regard, the processor may be configured to retrieve and execute program instructions stored on a computer-readable storage medium for controlling the switching devices 520.

Figure 5A:
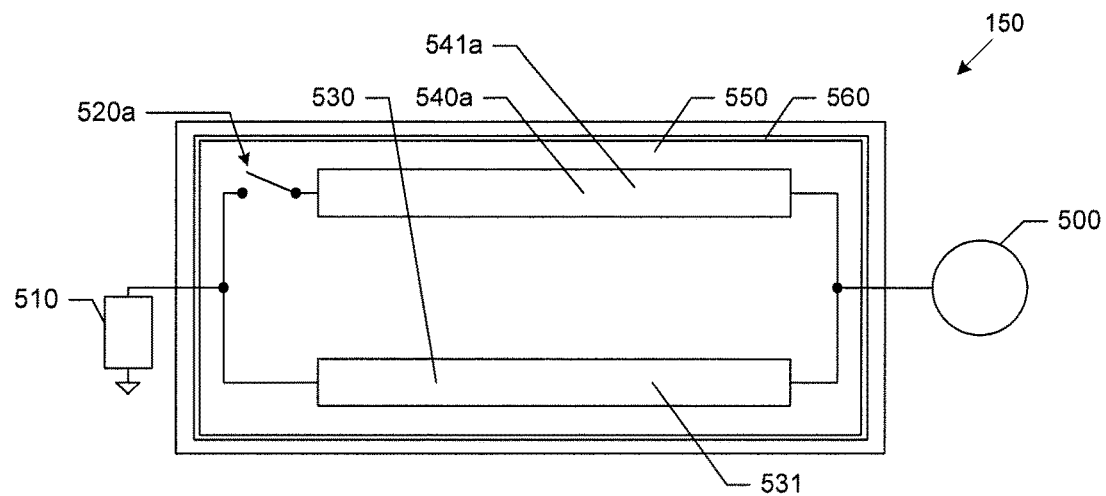
FIG. 5a illustrates a schematic of a near-field coupling device according to an exemplary embodiment of the present invention.

FIG. 5a illustrates one exemplary embodiment of a near-field coupling device 150 with an adaptable field pattern based on a modification in the impedance ratio. The near-field coupling device 150 of FIG. 5a, includes two conductive strips 530 and 540a that form two coupling elements 531 and 541a. The characteristic impedance of each coupling element, in isolation (i.e., when the coupling element is the only coupling element connected), may be equivalent. The equivalent characteristic impendence may arise as a result of, for example, the conductive strips 530 and 540a having equivalent widths. The total characteristic impendence of the connected coupling elements of the near-field coupling device 150 of FIG. 5a (i.e., the parallel combination of the characteristic impedance of first and second connected coupling elements 531 and 541a) may be modified by opening or closing the switching device 520a. The total characteristic impedance of the connected coupling elements of near-field coupling device 150 may have a first value when the switching device 520a is open, and a second value when the switching device 520a is closed. For example, the first value may be greater than the terminating load 510 resulting in a maximum magnetic flux near the ends of the coupling element 531. The second value may be less than the terminating load 510 resulting in a maximum magnetic flux near the center of the coupling elements 531 and 541a.

Figure 5B:
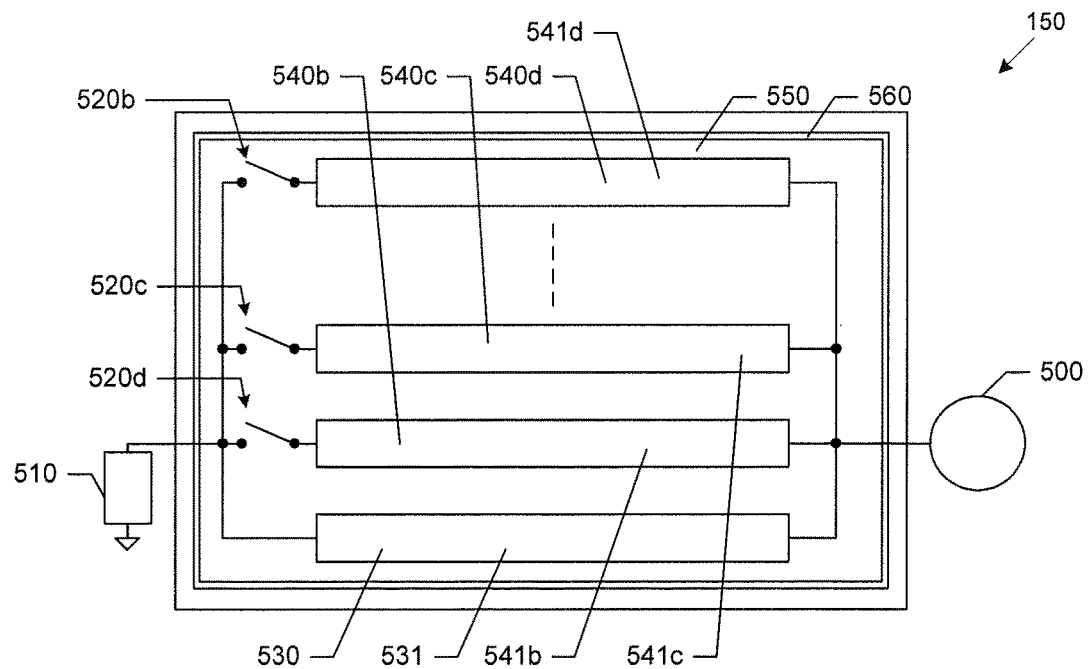
FIG. 5b illustrates a schematic of another coupling device according to an exemplary embodiment of the present invention.

FIG. 5b illustrates another exemplary embodiment of a near-field coupling device 150 with an adaptable field pattern based on a modification of the impedance ratio. The near-field coupling device 150 of FIG. 5b, includes any number of conductive strips, which may include conductive strips 530, 540b, 540c, and 540d. Each of the conductive strips together with the ground plane forms a coupling element 531, 541b, 541c, and 541d. The characteristic impedance of each coupling element in isolation from each other may be equivalent. In exemplary embodiments where the conductive strips are formed of the same substance (e.g., aluminum), the characteristic impedance of the coupling elements may be made equivalent by forming the conductive strips in a manner where each of the conductive strips have the same dimensions. The total characteristic impedance of one or more coupling elements may be modified by opening or closing the switching devices 520 (e.g., switching devices 520a, 520b, and/or 520c). Therefore, the total characteristic impedance of the connected coupling elements of the near-field coupling device 150 may be variable based of the configuration of the switch devices 520. As such, the electric and magnetic field patterns generated by the near-field coupling device 150 of FIG. 5b may include maximum magnetic field strength near or extending away from the ends of the coupling elements, a magnetic field strength near the center of the coupling elements, or a maximum magnetic field strength located between the ends and the center.

Figure 5C:
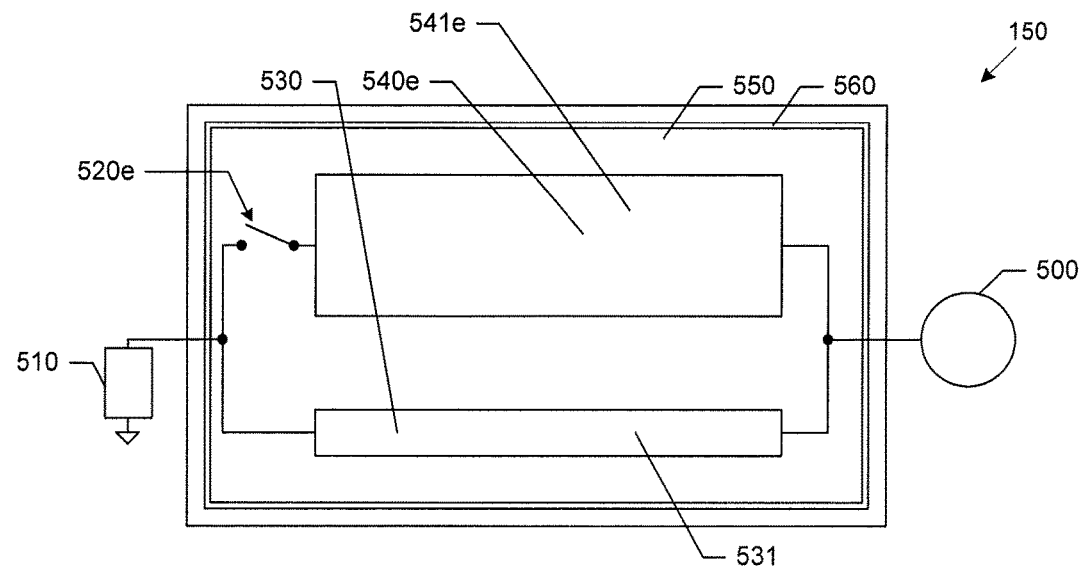
FIG. 5c illustrates a schematic of another coupling device according to an exemplary embodiment of the present invention.

FIG. 5c illustrates another exemplary embodiment of a near-field coupling device 150 with an adaptable field pattern based on a modification in the impedance ratio. The near-field coupling device 150 of FIG. 5c, includes two conductive strips 530 and 540e and a ground plane 560 that together form two coupling elements 531 and 540e. The characteristic impedance of coupling elements 531 and 541e, in isolation, from each other may be different. The difference in characteristic impendence may arise as a result of, for example, the conductive strips 530 and 540a having differing widths. The total characteristic impedance of the connected coupling elements 531 and 541e of the near-field coupling device 150 of FIG. 5c (i.e., the parallel combination of the characteristic impedance of connected coupling element 53 1and coupling element 541e) may be modified by opening or closing the switching device 520e. The total characteristic impedance of the connected coupling elements may have a first value when the switching device 520e is in an open configuration (i.e., the conductive strip 540e is unconnected), and a second value when the switching device 520e is closed configuration (i.e., the conductive strip 540e is connected). For example, the first value may be greater than the terminating load 510 resulting in a maximum magnetic field strength near the ends of the coupling element 531. The second value may be less than the terminating load 510 resulting in a maximum magnetic field near the center of the coupling elements 531 and 541e.

Figure 5D:
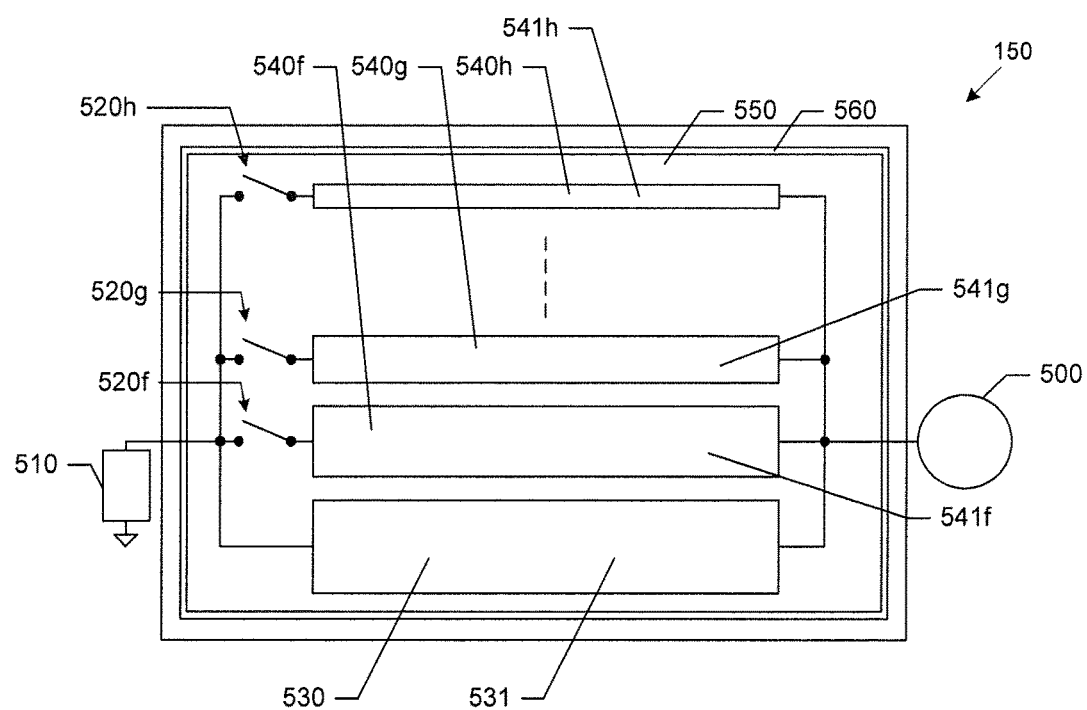
FIG. 5d illustrates a schematic of another coupling device according to an exemplary embodiment of the present invention.

FIG. 5d illustrates another exemplary embodiment of a near-field coupling device 150 with an adaptable field pattern based on a modification of the impedance ratio. The near-field coupling device 150 of FIG. 5d, includes any number of conductive strips, which may include conductive strips 530, 540f, 540g, and 540h, and a ground plane 560 that together form coupling elements 531, 541f, 541g, and 541h. The characteristic impedance of each coupling element, in isolation, may be different for each other. For example, the characteristic impedance of each coupling element, in isolation, may differ from each other because the widths of the conductive strips 530, 540f, 540g, and 540h may differ. The total characteristic impedance of the connected coupling elements of the near-field coupling device 150 of FIG. 5b (i.e., the parallel combination of the characteristic impedance of connected coupling elements 531, 541f, 541g, and 541h) may be modified by opening or closing the switching devices 520 (e.g., switching devices 520f, 520g, and/or 520h). The near-field coupling device 150 may have a variable impedance ratio based of the configuration of the switch devices 520. As such, the electric and magnetic field patterns generated by the near-field coupling device 150 of FIG. 5d may form a maximum magnetic field strength near or extending away from the ends of the connected coupling elements, a magnetic field strength near the center of the connected coupling elements, or a magnetic field strength concentrated more between the ends and the center.

FIGS. 5a through 5d illustrate exemplary near-field coupling devices embodiments of the present invention that include generally linear and parallel conductive strips. As examples, the conductive material of the conductive strips may be copper, gold, silver, aluminum or combination thereof, doped silicon or germanium, or the like. One of skilled in the art would appreciate that exemplary coupling devices of the present invention may also include non-parallel, non-linear, or tapered profiles of the conductive strips. For example, some embodiments of the present invention may include series of connected conductive strips. For purposes of the present specification and appended claims the term "non-linear profiles" refers to a segment of a conductive line or strip having one or more turns or changes in direction. A non-linear portion may have sharply defined turns to appear as a zig-zag type structure or may have relatively smooth turns to appear as a wavy structure. Various additional exemplary near-field coupling devices employing zig-zag type structures are described in commonly owned U.S. Pat. No. 7,398,054 and U.S. Patent Application Publication No. 2005/0045724 to Tsirline et al., which are hereby incorporated by reference in their entirety. Various additional exemplary near-field coupling devices employing tapered profiles are described in commonly owned U.S. Patent Application Publication Nos. 2007/0262873 and 2008/0238606 both to Tsirline et al., which are hereby incorporated by reference in their entirety.

Figure 10:
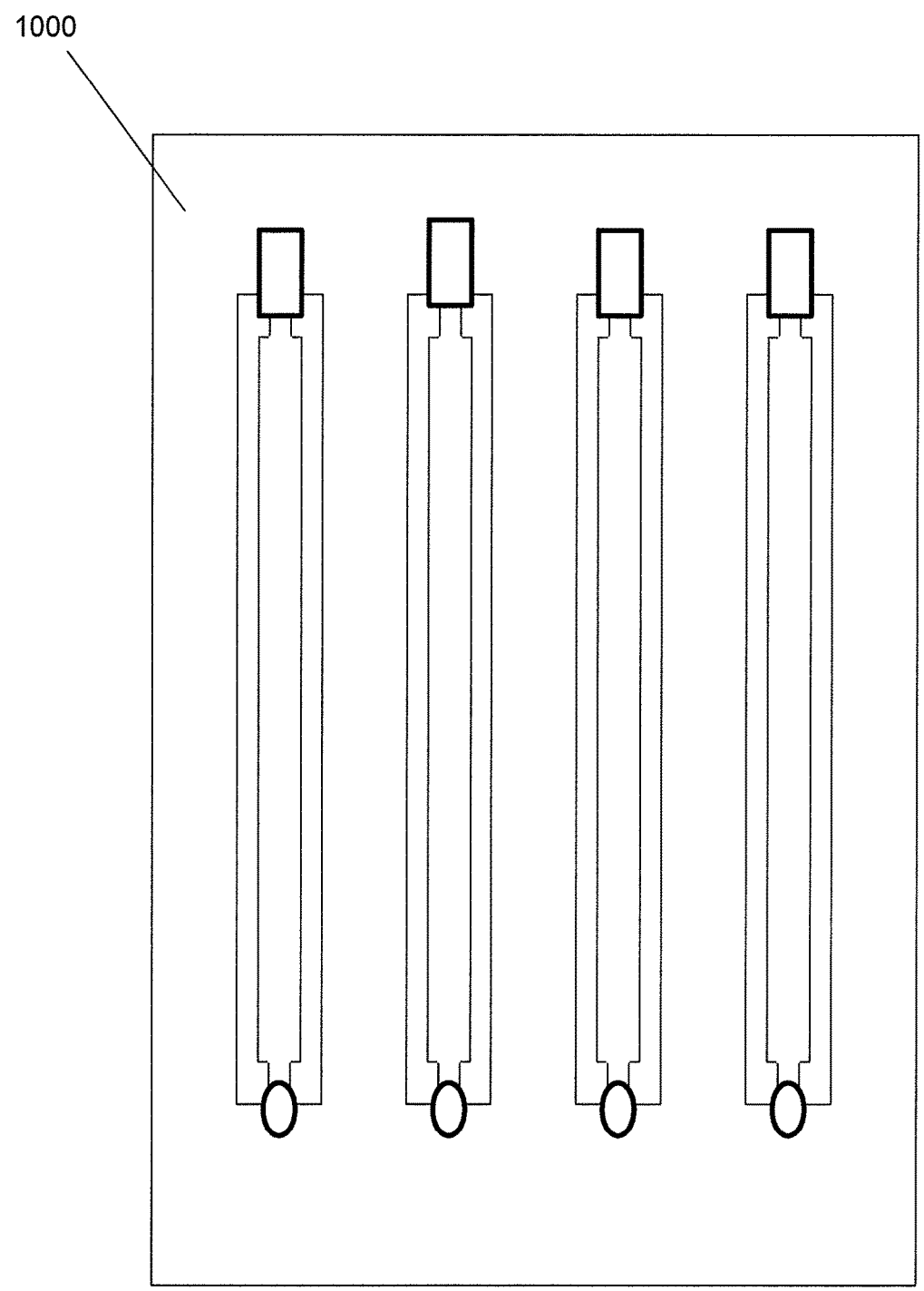
FIG. 10 illustrates a schematic of a near-field coupling device consistent with another exemplary embodiment of the present invention

Although, in illustrated embodiments of FIGS. 5a through 5d, the coupling elements take the form of a microstrip. In other embodiments, the coupling elements may take the form of other transmission line structures such as a stripline, a slotline or a finline. For example, various additional exemplary embodiments of the near-field coupling device may employ a stripline structure as further described in commonly owned U.S. Patent Application Publication Nos. 2007/0216591 and 2007/0262873 both to Tsirline et al., which are hereby incorporated by reference in their entirety. In yet other embodiments, the coupling elements may take the form of a planar waveguide, e.g., co-planar wave guide (CWG) 1000 as illustrated in FIG. 10. As another example, various additional exemplary embodiments of the near-field coupling device may employ a CWG structure as further described in commonly owned U.S. patent application Ser. No. 11/959,033 to Tsirline et al. filed on Dec. 18, 2007, which is hereby incorporated by reference in their entirety. As further described in the above incorporated references, for near-field coupling devices, the conductive strips and ground planes of the transmission lines or the CWG structure operate as a transmission line, rather than operating as a standing wave radiating antenna or magnetic field generating coil.

According to various embodiments of the present invention, the pattern of the electromagnetic fields may be adjusted to correspond to the placement, orientation, or other requirements of the targeted transponder within the encoding area described with respect to FIG. 2. For example, as discussed above, within a printer-encoder, the transponders 220 may be affixed to or embedded in the stream of individual media units 124, as shown in FIG. 2. However, the size and shape of the media units 124 or the placement of the transponders 220 within the media units 124 may vary depending on the media unit configuration. Altering the pattern of the electromagnetic field by modifying the impedance ratio, the near-field coupling device 150 can accommodate different locations or orientations of the transponders 220 and/or different types of transponders (e.g., dipole and loop), without substantially changing the encoding range 200 of the near-field coupling device 150 or requiring RF power adjustments.

Figure 8:
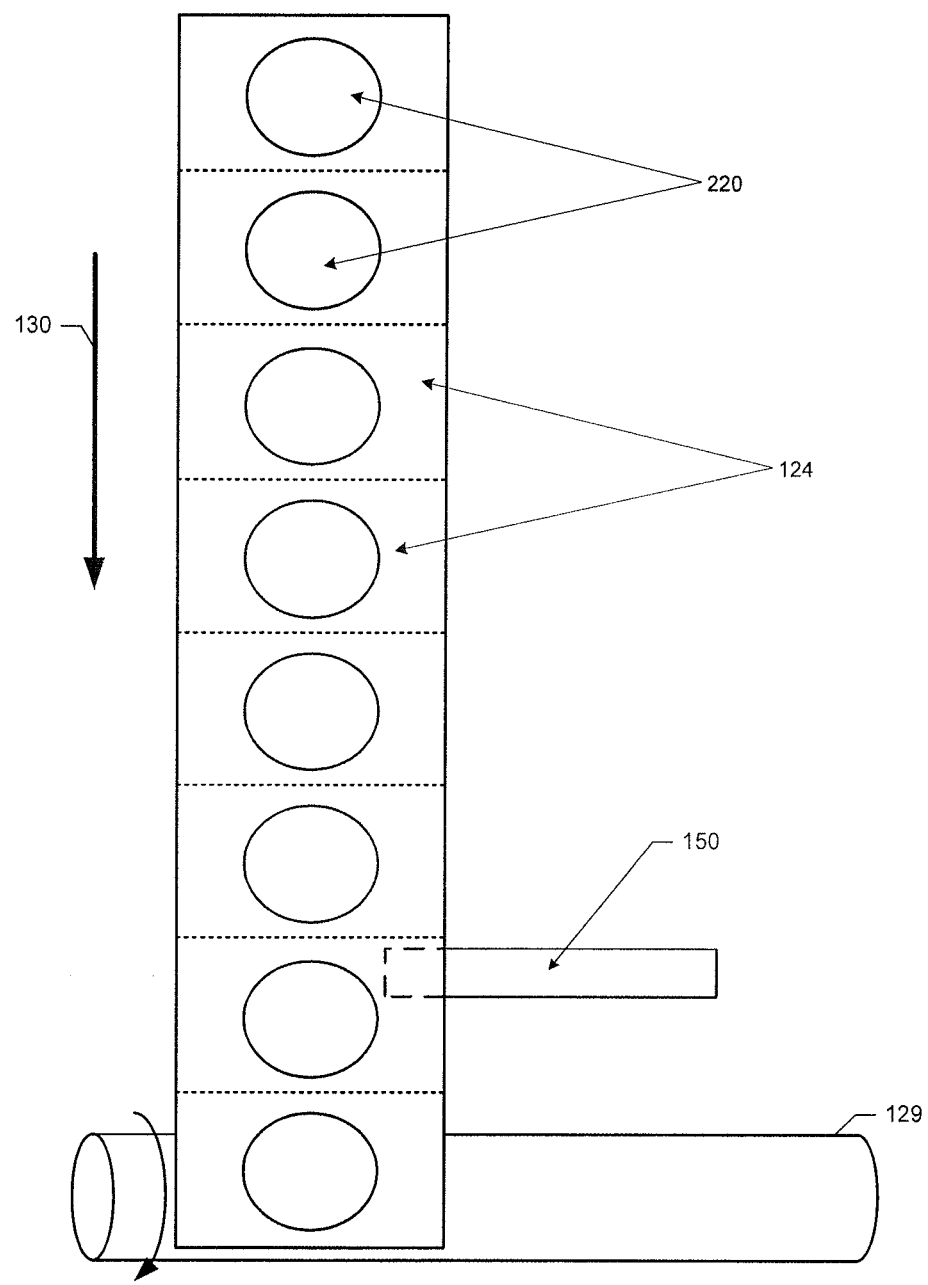
FIG. 8 is an illustration of an overhead view of the feed path of an edge justified web according to an exemplary embodiment of the present invention.

FIG. 8 illustrates an exemplary placement of media units relative to a near-field coupling device 150 according to various embodiments of the present invention. The near-field coupling device 150 may be placed cross-wise relative to the feeding path 130 such that length of the one or more conductive strips of the near-field coupling device are orthogonal to the feeding path 130. The alignment of the media units 124 within a printer-encoder may be referred to as either edge justified (also referred to as side-justified) or center-justified. FIG. 8 illustrates an example of an edge-justified system, and in particular a left edge-justified system. Further, the web to which the media units are affixed may have a narrow width, such as, for example, less than 6 inches. In some embodiments, the width of the web may be 2 inches. In an edge justified system, the media unit 124 and, thus the transponder 220 may be positioned near or aligned with the edge of the near-field coupling device 150. In this example, the media unit 124 and the transponder 220 are positioned near the left side of the near-field coupling device 150. As such, a near-field coupling device 150 configured to have maximum magnetic field strength near the edges of the near-field coupling device may be desirable, particularly since the transponders 220 of FIG. 8 may be representative of loop-type transponders, such as those illustrated in FIGS. 4a through 4c, which respond favorably to stronger magnetic fields. Accordingly, the switching devices of the near-field coupling device may be configured such that the total characteristic impedance of the connected coupling elements of the near-field coupling device may be greater than the impedance of the terminating load.

Figure 9:
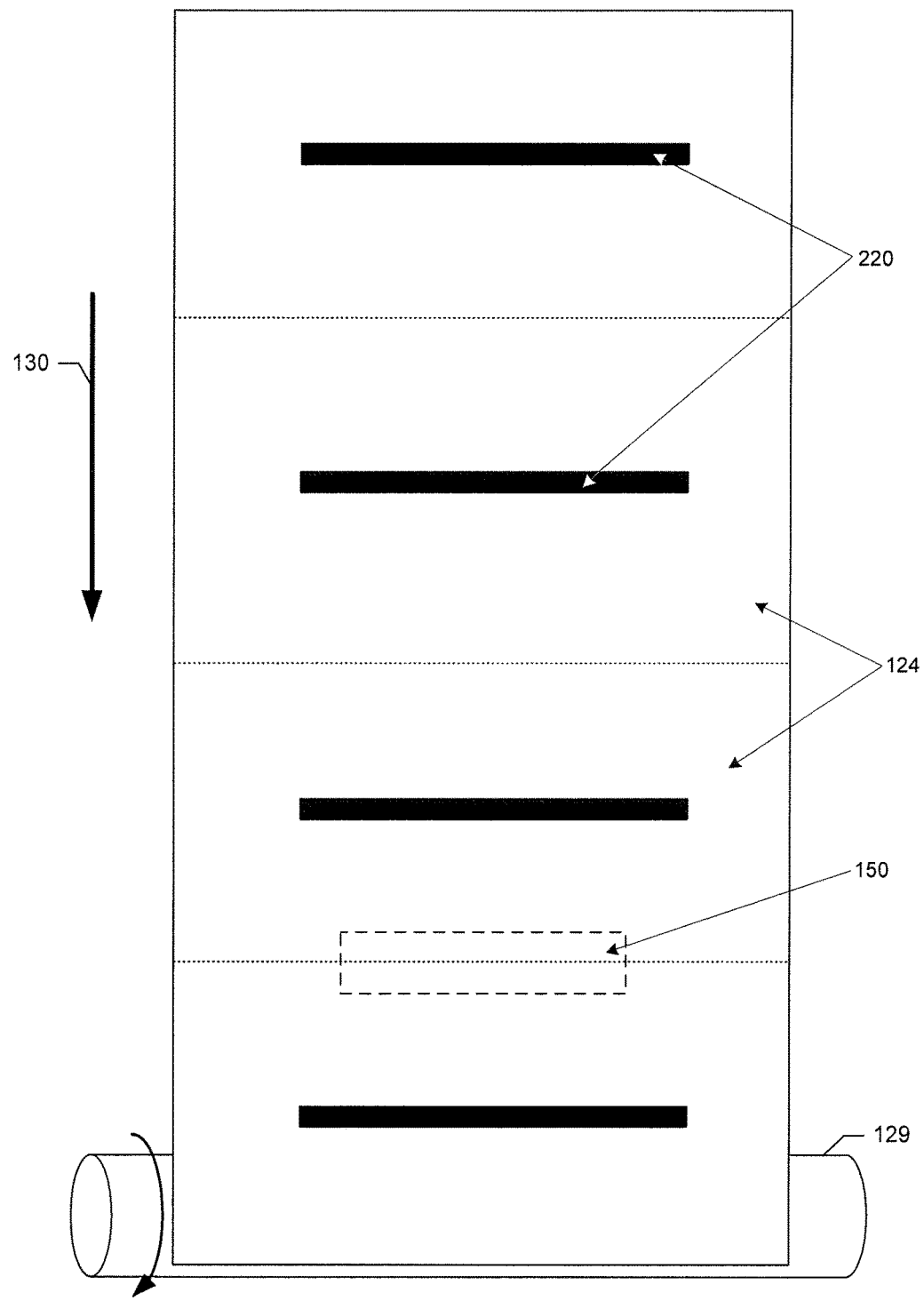
FIG. 9 is an illustration of an overhead view of the feed path of a center justified web according to an exemplary embodiment of the present invention.

FIG. 9 illustrates an example of a center justified system or a center justified transponder positioning system. In a center justified system, the media unit 124 and thus, the transponder 220 may be positioned proximate to the center of the conductive strip of the coupling device 150. As such, by controlling the switching devices of the near-field coupling device 150 the impedance ratio may be modified. In some embodiments, a total characteristic impedance of the one or more connected coupling elements that is greater than the impedance of the terminating load may be sufficient to communicate with a center justified transponder, such as the long and narrow or large dipole-type transponders, such as those illustrated in FIGS. 3a through 3f, which may be represented by the transponder 220 of FIG. 8, even though the magnetic field maximums may be near the edges of the near-field coupling device 150. However, a near-field coupling device having a total characteristic impedance of the one or more connected coupling elements that is less than the impedance of the terminating load may also be used to communicate with a center justified transponder. Therefore, in a center-justified system processing long and narrow, and large dipole-type transponders, the electric and magnetic field components from the coupling device may be optimally aligned with the center of the transponder to facilitate a strong coupling and, thus, reliable communication between the transponder and the transceiver through the coupling device. In some instances, a long and narrow, or large dipole-type transponder may be large enough relative to the coupling device that even in an edge-justified system, the transponder may be close enough to the center of the conductive strip not to make a significant difference in a near-field coupling device's ability to communicate with the transponder in the edge justified system compared to a center-justified system.

Another aspect of the present invention is a method of modifying the electromagnetic field distribution or pattern of a near-field coupling device 150 for a printer-encoder to a particular media unit configuration. The method includes loading the printer-encoder 120, as shown in FIG. 1, with a web 122 of media units 124 having embedded or attached transponders and advancing at least one media unit 124 to the encoding area 200, as shown in FIG. 2. Various methods for altering the properties of the near-field coupling device 150 may be utilized according to exemplary embodiments of the present invention.

In one exemplary embodiment, the printer-encoder 120 may include a sensor or other means for detecting and discriminating the media unit type (e.g., media units with loop-type or large dipole-type transponders). In some exemplary embodiments, the transceiver may communicate, e.g., via a second or supplementary antenna, with a special, additional, identification transponder, for example, on the roll of the media or the first transponder of the media, to determine the media unit type. Further, the printer encoder 120 may include a sensor that may identify the justification or cross-wise position of the media units. In some embodiments, a processor included in printer-encoder 120 may be configured to detect or receive data or information regarding the media unit type and justification (e.g., transponder cross-wise position and other transponder placement parameters). In some exemplary embodiments, a user may enter the media unit type and the justification (e.g., transponder cross-wise position and orientation) into the printer-encoder via a user interface to be received by a processor. Based on the media unit type and the justification, the processor may be configured to modify the impedance ratio of the near-field coupling device 150 by controlling the switching devices. The impedance ratio may be modified such that a desirable electromagnetic field pattern is generated.

In another exemplary embodiment, in order to configure the near-field coupling device to the loaded media unit's configuration, or more specifically to the orientation of the transponder on the label of the media unit and within the encoding area, a tuning cycle may be executed. As a sample media unit having a transponder may be in the encoding area, a transceiver may generate a test signal and transmit the signal through the near-field coupling device. The processor may command the switching devices to execute a number of possible combinations by energizing or connecting the conductive strips. In order to determine a "preferred radiating set" of connected or unconnected conductive strips, each combination may be monitored to determine what combinations of connected or unconnected conductive strips, referred to herein as "radiating sets," allow for a reliable encoding process for the targeted transponder. Furthermore, the processor may regulate the power level of the signal to determine what combination provides a reliable encoding process at the lowest power level. The combination that results in a reliable encoding process at the lowest power level may be determined to be the preferred radiating set for that particular media unit configuration. "Reliable encoding process" as used within this specification and the appended claims means the ability for the transceiver through the near-field coupling device to effectively communicate with the targeted transponder through the electromagnetic field pattern created by the near-field coupling device, while minimizing inadvertent communication with untargeted transponders and lowering a bit error rate.

Once the preferred radiating set is known, that radiating set may be configured for that media unit configuration and the printer-encoder may proceed with the normal processing and encoding (e.g., write and read action) of the media units. The timing or frequency of executing a tuning cycle may vary. For example, once the preferred radiating set is known for a particular media unit configuration, data and information for that preferred radiating set may be stored within a memory device included within the printer-encoder. When that particular media unit configuration is used, an operator may be able to enter that configuration information into the printer-encoder through a keypad (not shown) allowing the processor to set the preferred combination without re-executing a tuning cycle. Also, the processor may be programmed to run a tuning cycle after a certain event such as the turning on of the printer-encoder, the loading of media units, the passage of certain amount of time, or after predetermined number of media units have been processed.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A media processing device capable of encoding differently configured transponders, the media processing device comprising:
   a coupler configured to transmit wireless signals to an encoding area of the media processing device, the coupler to transmit the wireless signals via a plurality of radiating elements;
   a controller to control which set of the radiating elements is to transmit the wireless signals, the wireless signals having a first pattern when a first set of the radiating elements are transmitting the wireless signals, the wireless signals having a second pattern different than the first pattern when a second set of the radiating elements are transmitting the wireless signals;
   a processor to adapt the coupler to a transponder configuration by:
      encoding a first transponder of the transponder configuration using the first set of the radiating elements to transmit the wireless signals;
      executing a first encoding evaluation on the encoded first transponder;
      encoding a second transponder of the transponder configuration using the second set of the radiating elements to transmit the wireless signals;
      executing a second encoding evaluation on the encoded second transponder; and
      selecting, based on the first and second encoding evaluations, the first set or the second set as a preferred radiating set for the transponder configuration.

2. A media processing device as defined in claim 1, the first pattern including a maximum flux near ends of the coupler, the second pattern including a maximum flux near a center of the coupler.

3. A media processing device as defined in claim 2, further comprising a third pattern when a third set of the radiating elements are transmitting the wireless signals, the third pattern having a maximum flux between an end of the coupler and the center of the coupler.

4. A media processing device as defined in claim 1, wherein the controller is to control which set of the radiating elements is to transmit the wireless signals by energizing particular ones of the radiating elements.

5. A media processing device as defined in claim 1, wherein the controller is to control which set of the radiating elements is to transmit the wireless signals by controlling which set of the radiating elements defines a total characteristic impedance of the plurality of radiating elements.

6. A media processing device as defined in claim 5, wherein the controller is to define the total characteristic impedance of the plurality of radiating elements by connecting particular ones of the radiating elements to a terminating load.

7. A media processing device as defined in claim 1, further comprising memory to store an association between the preferred radiating set and the transponder configuration.

8. A media processing device as defined in claim 1, wherein the controller comprises a switch in communication with the processor.

9. A media processing device as defined in claim 1, wherein the first transponder is the same transponder as the second transponder.

10. A method of adjusting a pattern of a communications field to accommodate different transponder configurations, the method comprising:

receiving, in a media processing device, media having a first transponder configuration, the media processing device including a coupler capable of switching between different radiating sets to transmit communication fields having different patterns to an encoding area;

activating, using a processor of the media processing device, different ones of the radiating sets at respective times to encode at least one transponder of the media located in the encoding area;

evaluating, based on encoding results of the at least one transponder, respective ones of the radiating sets; and selecting, based on the evaluating, a first one of the radiating sets for the first transponder configuration.

11. A method as defined in claim 10, wherein activating different ones of the radiating sets comprises connected different combinations of a plurality of radiating elements to a terminating load.

12. A method as defined in claim 10, wherein activating different ones of the radiating sets comprises energizing different subsets of a plurality of radiating elements.

13. A method as defined in claim 10, further comprising storing, in memory of the media processing device, a designation of the selected first one of the radiating sets in association with the first transponder configuration.

14. A method as defined in claim 10, further comprising, in response to detecting media having the first transponder configuration being loaded in the media processing device, configuring the coupler according to the selected first one of the radiating sets.

15. A method as defined in claim 10, further comprising:

receiving, in the media processing device, media having a second transponder configuration different than the first transponder configuration;

activating different ones of the radiating sets at respective times to encode at least one transponder of the media located in the encoding area;

evaluating, based on encoding results of the at least one transponder, respective ones of the radiation sets; and selecting, based on the evaluating, a second one of the radiating sets for the second transponder configuration.

16. A method as defined in claim 10, a first one of the patterns including a maximum flux near ends of the coupler, a second one of the patterns including a maximum flux near a center of the coupler.

17. A computer-readable storage device comprising instructions that, when executed, cause a machine to:

activate different ones of radiating sets at respective times to encode at least one transponder of media located in an encoding area of the machine, the media having a first unit configuration, the different radiating sets being subsets of a plurality of radiating elements of a coupler;

evaluate, based on encoding results of the at least one transponder, respective ones of the radiating sets; and identify, based on the evaluation of the respective ones of the radiating sets, a preferred radiating set for the first unit configuration.

18. A computer-readable storage device as defined in claim 17, wherein the instructions, when executed, cause the machine to store the identified preferred radiating set in association with the first unit configuration.

19. A computer readable storage device as defined in claim 17, wherein activating different ones of the radiating sets comprises energizing different subsets of the plurality of radiating elements.

20. A computer-readable storage device as defined in claim 17, wherein the instructions, when executed, cause the machine to, in response to detecting media having the first unit configuration being loaded in the machine, configure the plurality of radiating elements according to the preferred radiating set.

* * * * *